United States Patent [19]

Oliveira

[11] 4,303,723

[45] Dec. 1, 1981

[54] SOUND BARRIER MATERIAL

[75] Inventor: Paul E. Oliveira, New Bedford, Mass.

[73] Assignee: The Goodyear Tire & Rubber Company, Akron, Ohio

[21] Appl. No.: 118,039

[22] Filed: Feb. 4, 1980

[51] Int. Cl.$^3$ .................... B32B 7/00; C04B 43/00
[52] U.S. Cl. ................................ 428/247; 428/251; 428/252; 428/273; 428/255; 428/285; 428/290; 428/921; 428/256; 181/294
[58] Field of Search .............. 428/247, 251, 252, 255, 428/256, 273, 285, 290, 921; 181/294

[56] References Cited

U.S. PATENT DOCUMENTS

| | | | |
|---|---|---|---|
| 3,360,422 | 12/1967 | Desch | 428/247 |
| 3,575,779 | 4/1971 | Chapman et al. | 428/247 X |
| 4,110,510 | 8/1978 | Oliveira | 428/255 X |
| 4,112,164 | 9/1978 | Koss | 428/251 |
| 4,170,675 | 10/1979 | Greengrass | 428/256 X |

*Primary Examiner*—P. Ives
*Attorney, Agent, or Firm*—J. D. Wolfe

[57] ABSTRACT

A sound barrier material for a road or a trainway comprised of a barium sulfate loaded chlorinated polyethylene laminated to each side of a foraminous metal member with a coating of about 0.05 to 8.13 centimeters in gauge.

6 Claims, No Drawings

SOUND BARRIER MATERIAL

TECHNICAL FIELD

This invention relates to a relatively dimensionally stable, acoustical and safety sheet or barrier. More particularly this invention relates to a roadway barrier to reduce noise transmission and provides a safety barrier.

BACKGROUND ART

Railways, roadways, etc. have high noise transmission levels and consequently these high noise levels can be harmful to occupants of said area and thus reduce the comfort of being in these areas. It has been desirable to provide such areas with lightweight, flexible, sound absorbent or transmission loss barriers to lower the noise level but heretofore these barriers have been expensive and unsightly.

THE INVENTION

The object of this invention is to provide an improved sound absorbent and transmission loss barrier or sheet capable of effectively reducing the noise level in these ways.

The noise abatement materials of this invention can be of any shape but preferably is supplied as a flexible sheet which can be readily cut and attached to a post or support member to forestall noise transmission into or through an area near the way. Usually the sheet is 0.12 to 8.13 centimeter gauge that can be hung or attached to two or more supports to form the desired sound and safety barrier along the way.

Best Mode for Carrying Out the Invention

The specific nature of this invention and its advantages can be more readily appreciated by reference to the following representative and exemplary examples wherein all parts and percentages are by weight unless otherwise designated.

EXAMPLE 1

A nonflammable mesh material of 0.30 to 4.88 kilograms per square meter was coated with a plasticized vinyl chloride resin to give a mesh base sheet having preferably a width of about 30.48 centimeters or more. This mesh base was passed through calender rolls to apply a predetermined amount of rubbery coating composition to each side having the composition like that of the recipe of Table I. The specific gravity of the compound is in the range of 1.50 to 2.25. The recipe is as set forth below in Table I.

TABLE I

| Ingredient | Parts by Weight |
| --- | --- |
| Chlorinated polyethylene* | 100 |
| Barium sulfate | 50-200 |
| Plasticizer | 5-50 |
| Titanium dioxide | .25-10 |
| Stabilizer | 1-15 |
| Carbon black | 1-100 |

*36 to 48% $Cl_2$

The above ingredients were mixed on a conventional rubber or plastic mixer to give a mixture of uniform texture that can be applied on the calender to the mesh sheet.

The two mesh base sheets having a coating of the rubbery composition of the recipe, of predetermined gauge, preferably 0.05 to 7.7 centimeters on each face thereof, have laminated therebetween a wire sheet or foraminous metallic member by placing the two sheets in contact with wire sheet therebetween at elevated temperature and pressure in a plate press, press rolls or related pressure-temperature means.

A laminate made as described comprises a foraminous metallic member between two polyvinyl chloride impregnated nonflammable mesh sheets having a predetermined gauge coating of the composition of the recipe of Table I.

Preferably the barrier is nonflammable and in these cases glass fiber mats or sheets are preferred over other fabric materials. A sheet of polyurethane foam of about 0.24 to 0.040 and preferably 0.029 to 0.37 gram per cubic centimeter was cut from a polyurethane bun having the desired density to provide a sheet of the desired thickness, usually 0.63 to 3.81 centimeters thick.

Since chlorinated polyethylene and polyvinyl chloride can degrade by generation of HCl it is desirable that they be stabilized with suitable stabilizers such as epichlorohydrin-bisphenol-A resin or the compounds viz. litharge, tin and barium compounds, used to stabilize polyvinyl chloride and chlorinated polyethylene rubbers.

Any of the plasticizers for polyvinyl chloride or chlorinated polyethylene can be used in this invention but chlorinated paraffin wax, 10 to 35 percent chloride, is preferred.

While certain representative embodiments and details have been shown for the purpose of illustrating the invention it will be apparent to those skilled in this art that various changes and modifications may be made therein without departing from the spirit or scope of the invention.

I claim:

1. A sound and safety barrier material comprised of a metallic foraminous member sandwiched between two polyvinyl chloride impregnated mesh sheets, said sheets having a coating thereon of about 0.05 to 7.7 centimeters of a barium sulfate loaded chlorinated polyethylene.

2. The sound barrier material of claim 1 wherein 50 to 200 parts of barium sulfate is present in each 100 parts of chlorinated polyethylene and said chlorinated polyethylene contains from 36 to 48 percent of chlorine.

3. The sound barrier material of claim 1 wherein the material is stabilized with epichlorohydrin-bisphenol-A resin and contains chlorinated paraffin wax.

4. The sound barrier material of claim 1 wherein the metallic foraminous member is a wire sheet.

5. The sound barrier material of claim 1 wherein each of the mesh sheets is glass.

6. The sound barrier material of claim 5 wherein the material is stabilized with epichlorohydrin-bisphenol-A resin and contains chlorinated paraffin wax.

* * * * *